Dec. 20, 1955  E. KOLISCH  2,727,391
EQUIPMENT FOR AUTOMATICALLY RATING OBJECTS OR PACKAGES
ACCORDING TO TWO OR MORE PARAMENTERS THEREOF
Filed March 22, 1954  5 Sheets-Sheet 2
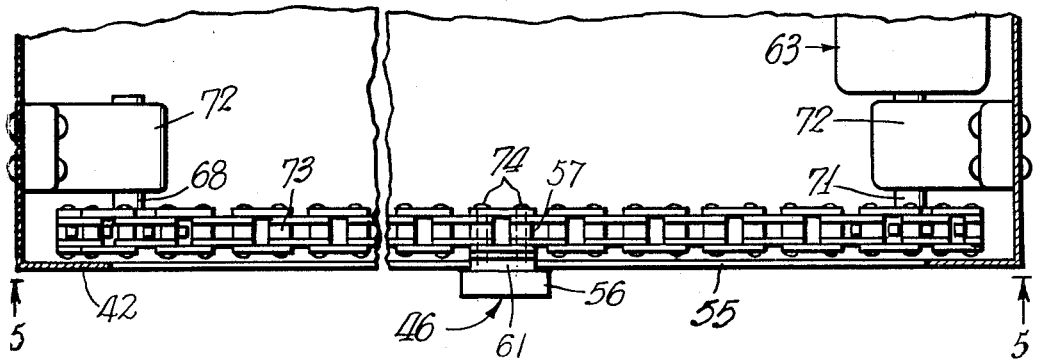
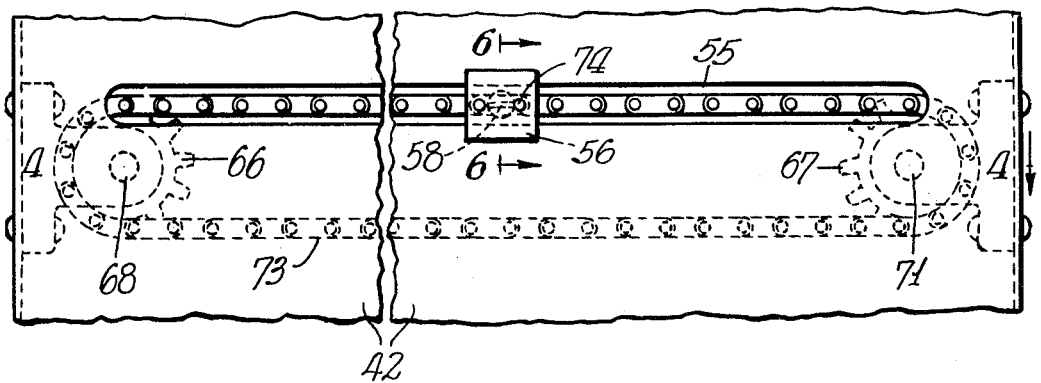
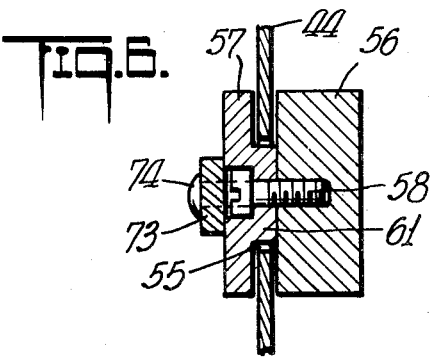
INVENTOR.
Emil Kolisch
BY Dean Fairbank & Hirsch
ATTORNEYS Dec. 20, 1955 E. KOLISCH 2,727,391
EQUIPMENT FOR AUTOMATICALLY RATING OBJECTS OR PACKAGES
ACCORDING TO TWO OR MORE PARAMENTERS THEREOF
Filed March 22, 1954 5 Sheets-Sheet 3

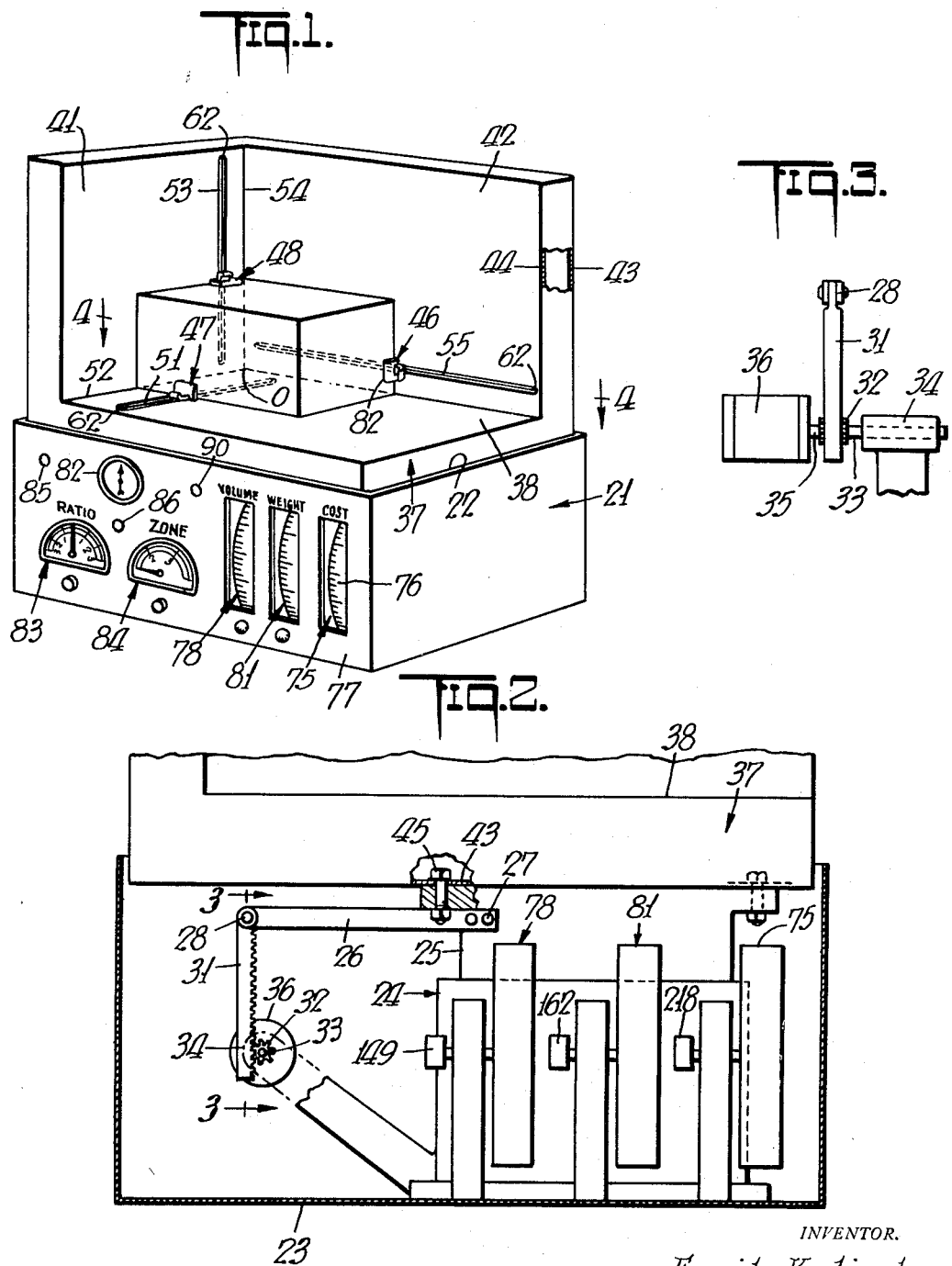

INVENTOR.
Emil Kolisch
BY Dean Fairbank & Hirsch
ATTORNEYS

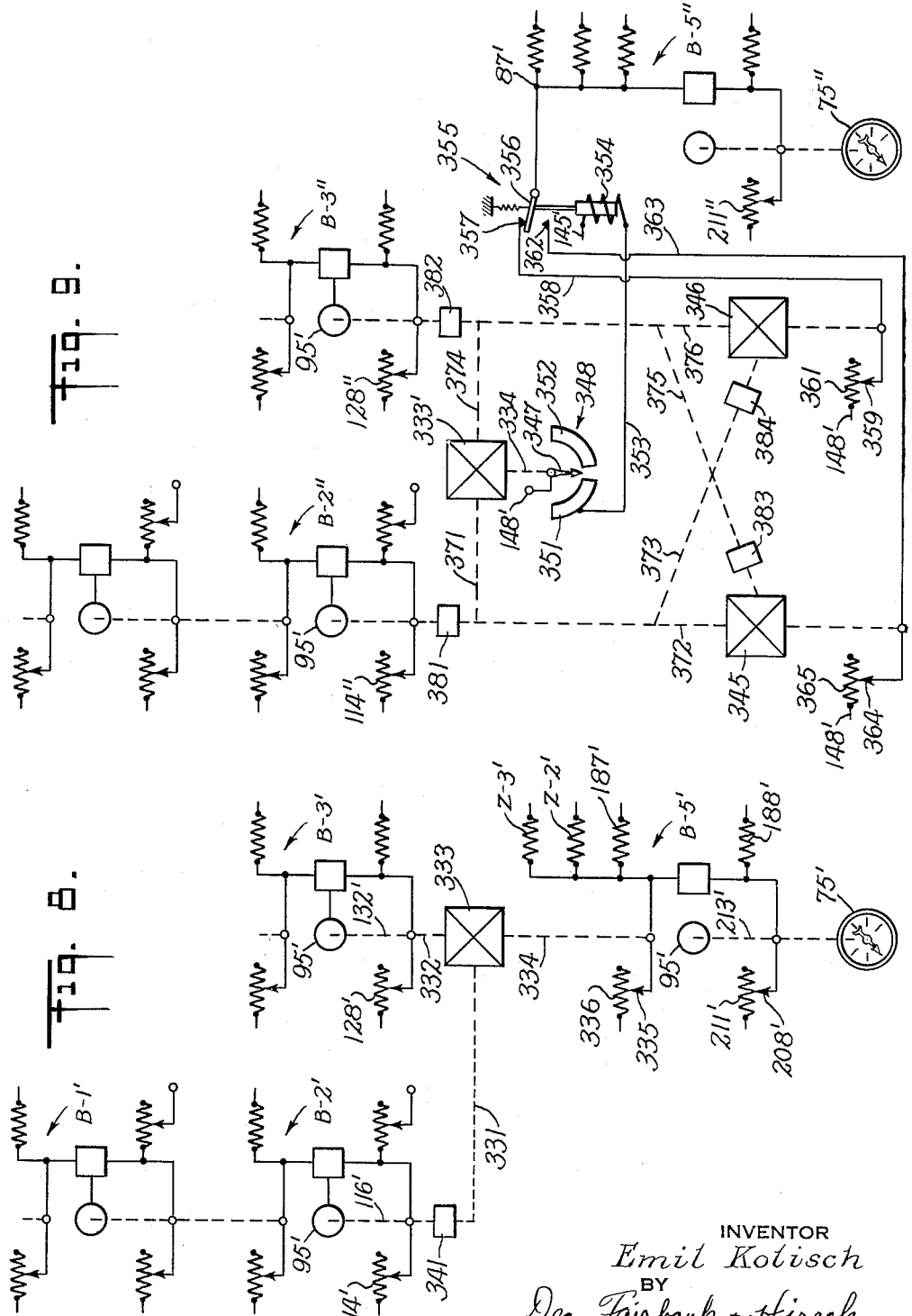

Dec. 20, 1955　　　　　　　E. KOLISCH　　　　　　　2,727,391
EQUIPMENT FOR AUTOMATICALLY RATING OBJECTS OR PACKAGES
ACCORDING TO TWO OR MORE PARAMENTERS THEREOF
Filed March 22, 1954　　　　　　　　　　　　5 Sheets-Sheet 5
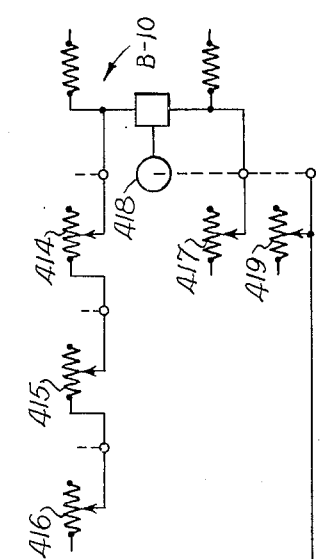
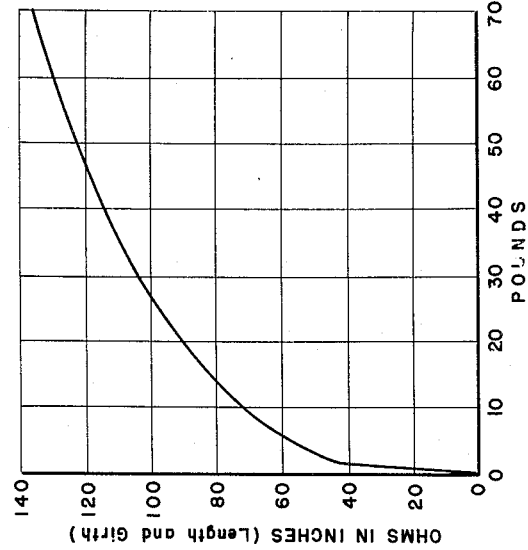
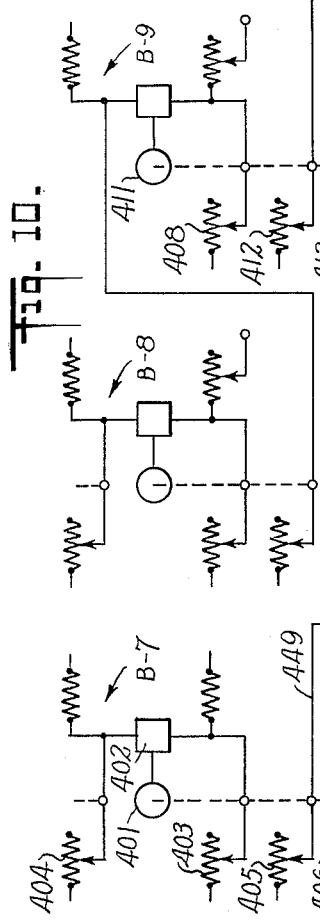
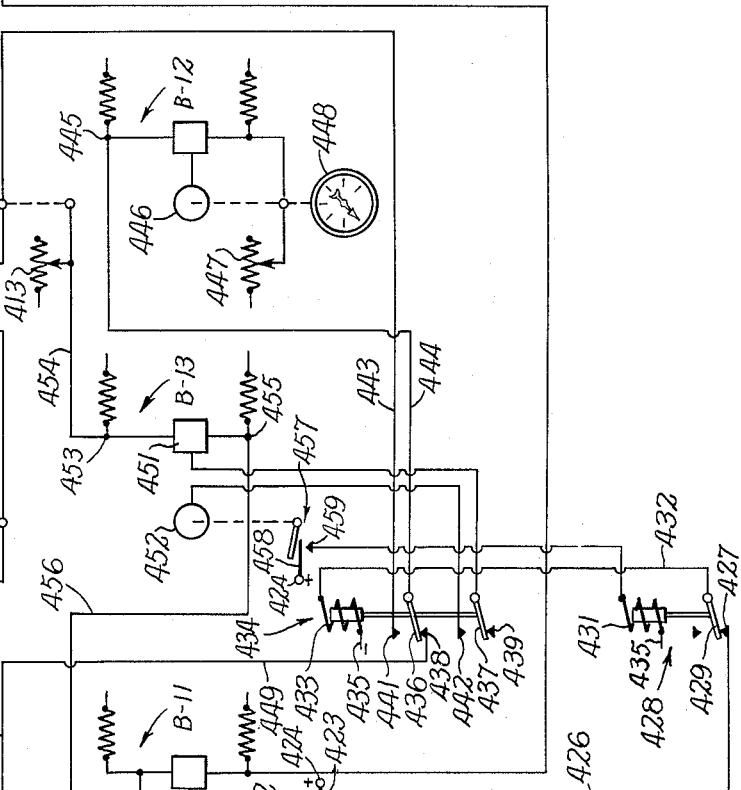
INVENTOR
*Emil Kolisch*
BY
*Dean Fairbank + Hirsch*
ATTORNEYS

United States Patent Office 2,727,391
Patented Dec. 20, 1955

2,727,391

EQUIPMENT FOR AUTOMATICALLY RATING OBJECTS OR PACKAGES ACCORDING TO TWO OR MORE PARAMETERS THEREOF

Emil Kolisch, New York, N. Y., assignor to Continental Silver Co., Inc., a corporation of New York Application March 22, 1954, Serial No. 417,683

17 Claims. (Cl. 73—432)

The present invention is more especially concerned with the expeditious rating of objects or packages for determining transportation or shipping charges according to two or more parameters, among which may be weight, volume and other dimensional characteristics.

As conducive to a clear understanding of the invention and its purposes, it is noted that various carriers such as the United States Post Office, parcel delivery services including express companies, whether trucks, railroad cars, airplanes or other means of transportation are used, have heretofore in general based shipping charges on weight. In those cases in which shipping space rather than weight is the controlling consideration, such charges have generally been based on volume. Limitations are generally set by certain carriers, such as the United States Post Office, for instance, as to maximum dimensional characteristics of objects or packages accepted for shipment.

The determination by manual measurement with or without resort to multiplication tables of the volume of an object for shipment has proved to be so time-consuming and expensive that, in ordinary practice, the volume has been ascertained by estimate or guess, with inevitable error.

Charging by weight solely gives an unjustified advantage to the shipper of objects or packages of relatively large volume and light weight, and charging by volume solely gives an unjustified advantage to the shipper of objects or packages of relatively heavy weight and small volume.

It is accordingly among the objects of the invention to provide an equipment for automatically and expeditiously determining the rating or charge that flexibly takes into account both weight and volume of the objects or packages to be transported, all according to principles that will be equitable to both the shipper and the carrier, regardless whether the object or package is of relatively heavy weight and small volume, or of relatively light weight and large volume.

In one embodiment, the invention affords automatic means for comparing two parameters such as weight and volume and automatically selecting as the basis of charge that one of the two parameters which affords the higher revenue to the carrier.

In another embodiment, one of two parameters such as weight and volume or length and girth combined and weight, for example, is automatically selected as the underlying basis for the charge or rating and there is automatically added to such charge a desired adjustment for the magnitude of the other of said selected parameters.

Another object is to provide a simple, automatic equipment for substantially instantly determining the volume of the object or package without the need for manual measurement, without the need for multiplication or reference to tables, or the use of slide rules, and without the possibility of human error.

The invention affords in one of its embodiments a simple equipment to accomplish the latter object, said equipment comprising three distance sensing means, respectively for the length, width and height of the object; electrical impedances under control of the respective sensing means, and two electrical bridges, the first said bridge having two of said variable impedances in opposed arms thereof and having a balancing impedance in a third arm thereof, which assumes a setting, when the bridge is in balance, that corresponds to the product of the two dimensions that control the first two impedances.

The third impedance constitutes one arm of a second electrical bridge, the opposed arm of which has an impedance unit to be set to a value equal or proportional to the product of the two dimensions entered into the first bridge. An adjustable impedance in a third arm of the second bridge when balanced, will accordingly have a value equal or proportional to the product of the three dimensions or the volume of the object.

Generally stated, it is another object of the invention to provide a thoroughly flexible system for automatically determining the rating in manner not limited to either of two parameters, such as, for example, weight or volume, as the basis for charge, and without arbitrary limitation in the dimensional characteristics of objects accepted for shipment, and more particularly to attain such object by equipment for rating automatically and expeditiously which takes into account at least three characteristics selected from its weight, volume, area, length, height, width, girth, or other dimensional characteristics.

It is a more specific object of the invention to provide an equipment by which a third parameter, preferably a dimensional parameter of the object or package such as length plus girth for instance, serves as the control when the object or package is of proportions rendering it difficult to handle or space-consuming relative to its weight, in order to determine the selection of that one of the other two or controlled parameters, such as weight and volume, for instance, which shall serve as the basis for a higher rating or charge.

Another object is to provide a system of the above type in which, should the projected higher rating of the package determined by the controlling parameter in fact effect a lower rating, the system will in any event automatically determine the higher rating.

In the accompanying drawings in which are shown one or more of various possible embodiments of the several features of the invention, Fig. 1 is a perspective view of an illustrative equipment for rating objects, Fig. 2 is a front elevational view of the equipment shown in Fig. 1 on a larger scale with parts broken away, Fig. 3 is a sectional view taken along line 3—3 of Fig. 2, Fig. 4 is a view on a greatly enlarged scale taken along line 4—4 of Fig. 1, Fig. 5 is a view taken along line 5—5 of Fig. 4, Fig. 6 is a detail sectional view taken along line 6—6 of Fig. 5, Fig. 7 is a circuit diagram of the equipment according to one embodiment thereof, Figs. 8, 9 and 10 are circuit diagrams of other embodiments of the equipment, and Fig. 11 is a calibration curve for the embodiment of Fig. 10.

In the embodiment shown in Figs. 1 through 7, two parameters of the object are determined and based upon the values of these parameters, one or the other is selected to determine the rating of the object.

The equipment shown in Figs. 1 through 7 will be described as suitable for rating by volume objects up to the length of five units, height of five units and width of four units in increments of one unit, from one unit up and for rating by weight objects to ten units, also in increments from one unit up.

It is of course to be understood that the equipment could rate objects of a much greater range of size or weight and the simple example herein shown and described, illustrates the principles of the invention.

The units of length, width and height may be centimeters, meters, inches, feet, yards or any arbitrary unit of length as desired, and the units of weight may be grams, ounces or pounds or any arbitrary unit of weight as desired.

In Fig. 1 is shown a rectangular housing 21 illustratively a box of any suitable material having an open top 22. Mounted on the floor 23 of the housing as shown in Fig. 2, is a weighing scale 24 which may be of any suitable type such as, for example, that put out by Pitney-Bowes Company and designated by the trade-mark "Post-O-Meter," and such weighing scale will only be described to the extent necessary for a clear understanding of the invention.

As shown in Fig. 2, the weighing scale comprises a vertically movable support 25 controlled by a weight placed thereon to move the actuating arm 26 affixed thereto as at 27. The free end 28 of the actuating arm 26 carries a rack 31 which engages a pinion 32 affixed on a transverse shaft 33 rotatably mounted in a suitable bearing 34, as shown in Fig. 3, and connected to the shaft 35 of a variable impedance such as a variable resistor 36. The variable resistor 36 is so calibrated that in the illustrative example herein shown, each unit of weight, which illustratively is measured in pounds, will place such portion of variable resistor 36 in circuit of ohmic value equal to eight ohms.

Mounted on the vertical support 25 of the weighing scale is a frame 37 by means of which the dimensions of the object being rated can be measured. As shown in Figs. 1 and 2, the frame 37 desirably comprises a substantially rectangular platform 38 of dimensions slightly less than that of the open top 22 of the rectangular housing 21, an end wall 41 and a rear wall 42. The platform and said walls each desirably comprises a pair of spaced parallel plates 43 and 44 as shown in Fig. 1, the plate 43 of platform 38 which forms the floor of frame 37 being affixed to support 25 as by bolts 45 (Fig. 2).

In order to determine the length, width and height respectively of the object to be rated, the frame 37 desirably has a plurality of distance sensing means such as measuring members 46, 47 and 48, slidably mounted thereon adjacent the three axes of a three-dimensional system of rectangular coordinates. To this end, the plate 44 of platform 38 desirably has a transverse slot 51 therein adjacent the end 52 thereof, the plate 44 of wall 41 desirably has a vertical slot 53 therein adjacent the vertical edge 54 of the frame and the plate 44 of wall 42 desirably has a longitudinal slot 55 therein adjacent the lower edge thereof.

The measuring members (Fig. 6) each desirably comprises a pair of blocks 56 and 57 positioned respectively on each side of the associated slot and retained together by screws 58. One of the blocks, i. e., block 56 is positioned on the outer surface of the associated plate 44 and defines a finger to engage the object being measured and the other of said blocks, i. e., block 57 which is on the inner side of the associated plate 44, has a projecting portion or rib 61 which extends into the slot to guide the measuring member therealong.

Although the measuring members, as illustratively shown, are manually movable along the associated slots, it is of course to be understood that they could normally be retained at the ends 62 of such slots and moved into engagement with the extremities of the object being measured by any suitable mechanical means or electrical means such as a spring or a motor which would be obvious to one skilled in the art.

Each of the measuring members 46, 47 and 48 controls the setting of a variable impedance unit such as a variable resistor 63, 64, 65 respectively. Although the variable resistors may be controlled by the associated measuring members in any suitable manner, in the illustrative embodiment herein shown, referring to measuring member 46 (Fig. 1), a pair of sprocket wheels 66 and 67 (Figs. 4 and 5) are affixed to shafts 68, 71, respectively, journalled in suitable bearings 72 at each end of the rear wall 42. Encompassing each of the pairs of sprocket wheels is a sprocket chain 73, one of the runs of which is aligned with the associated slot 55, as is clearly shown in Fig. 5. The associated measuring member is affixed to the sprocket chain 73 by means of screws 74 which extend through the sprocket chain into the inner block 57 as is clearly shown in Fig. 4. The variable resistor 63 associated with the measuring member 46 is driven by the shaft 71 which carries the sprocket wheel 67 so that movement of the measuring member and the chain will cause rotation of such sprocket wheels to set the variable resistor 63 to a value proportional to the corresponding dimension of the object.

As the control means for the variable resistors 64 and 65 are identical with that described for variable resistor 63, they will not be described. The variable resistors are desirably calibrated in the illustrative embodiment herein shown so that each inch of dimension will tap off that portion of the associated variable resistor equal to one ohm.

With the construction above described, after the measuring members 46, 47 and 48 are moved to the ends 62 of the associated slots, if for example, an object or package is placed on platform 38, as shown in Fig. 1, with its corner at the origin "O" and engaging the end wall 41 and the rear wall 42 and the measuring members are moved along their associated slots so that the associated block 56 engages the end, side and top of the box, due to the movement of the associated sprocket chains and sprocket wheels, that portion of the associated variable resistors 63, 64 and 65 will be placed in circuit correlated with a longitudinal, transverse and vertical dimension of the object. In addition, the weight of the object on the platform 38 will affect the weighing scale, which is previously set at zero to compensate for the weight of the frame 37, so that rotation of shaft 33 will place that portion of variable weight resistor 36 in circuit proportional to the weight of the object.

The electrical circuits hereinafter described are controlled by the dimensions and by the weight of the object in order to determine the shipping charge or rating (whether according to volume or to weight) upon an indicating device, illustratively a drum 75 having its periphery 76 exposed through the front wall 77 of the housing 21 and which desirably has such periphery calibrated in monetary units such as in cents automatically to register the charge or rating of the particular object.

If desired, the housing may also have similar indicating drums 78 and 81, calibrated, for example, in cubic inches and pounds to indicate the volume and weight respectively of the object and an indicator or meter 82 calibrated to indicate the density of the object, said drums and meter also being exposed through the front panel 77 of the housing. The equipment may also have one or more additional control switches to introduce further factors that may be significant in determining the rating of the object. Thus there is shown on housing 21 a manually operable control switch 83 designated the ratio switch which serves to set up a predetermined relation between volume and weight in determining the rating. Moreover, there is shown a switch 84 designated the zone switch which serves to multiply the basic charge or rating by a predetermined factor, illustratively in accordance with the postal or other zone to which the object is to be transported. In addition, the panel 77 has a start switch 85, a density switch 86 and a resetting switch 90.

Thus, the drum 75 will indicate the amount to be charged for transportation of an object placed on the equipment, such charge to depend usually on weight. But in all such cases where the volume is to be the controlling factor, such volume rather than the weight shall control the drum reading, which reading automatically takes into account also the ratio factor determined by switch 83, and the zone factor determined by switch 84, all of which will appear more clearly in the following description of the electrical circuits.

Referring now to the circuit diagram shown in Fig. 7, the equipment comprises a plurality of self-balancing bridge circuits, illustratively six in number, designated B-1, B-2, B-3, B-4, B-5 and B-6.

Connected across each of the bridges B-1 to B-6 to junctions 87, 88 is a servo-amplifier 91 having a pair of output terminals 92, 93. Terminal 92 of bridges B-1 to B-5 is connected to input terminal 94 of a servo-motor 95 and terminal 93 is connected by lead 96 to the contact arm 97 of an associated relay RL-1, RL-2, RL-3, RL-4 and RL-5. Arm 97 is normally spaced from fixed contact 98 when the coil 101 of the associated relay is de-energized and said fixed contact is connected by lead 102 to input terminal 103 of servo-motor 95. The output terminals 92, 93 of servo-amplifier 91 of bridge B-6 are connected directly to input terminals 94, 103 of the associated servo-motor 95.

The servo-amplifier and servo-motor may be of any suitable type, such as the type put out by the Brown Instrument Division of the Minneapolis Honeywell Co. under the name Brown Electronik "continuous balance" unit No. 354,574.

The bridges B-1 and B-2 determine the volume of the object being measured. To this end the width resistor 64 is connected in one arm of bridge B-1 and the height resistor 65 is connected in the opposed arm of bridge B-1. A variable balancing resistor 105 is connected in the third arm of such bridge and a resistor 104 is connected in the fourth arm thereof.

The movable arm 106 of variable resistor 105 is connected by shaft 107 to the servo-motor 95 of bridge B-1 to be driven thereby so that depending upon the position of arm 106, by the formula:

$$\frac{\text{Resistor } 64}{\text{Resistor } 104} = \frac{\text{Resistor } 105}{\text{Resistor } 65}$$

a predetermined resistance will be placed into circuit of value proportional to the product of the values of the width and height resistors in circuit.

A variable resistor 108 connected in one arm of bridge B-2 has its movable arm 111 connected by shaft 112 to the shaft 107 of servo-motor 95 of bridge B-1, so that the variable resistor 108 will be set to a position corresponding to the setting of variable resistor 105. The length variable resistor 63 is connected in the arm of bridge B-2 opposed to variable resistor 108. A variable volume resistor 114 is connected in the third arm of the bridge B-2 and a fixed resistor 113 is connected in the fourth arm of bridge B-2 opposed to resistor 114.

The variable resistor 114 has its contact arm 115 connected to the shaft 116 of servo-motor 95 of bridge B-2, and such arm 115 is connected by lead 117 to contact arm 118 of relay RL-6, which normally engages fixed contact 121 connected by lead 122 to contact arm 123 of relay RL-7 which normally engages fixed contact 124 connected by lead 125 to junction 88 of the bridge B-2 so that normally the variable resistor 114 will be connected in such bridge. The shaft 116 of the servo-motor 95 of bridge B-2 is also connected to drum 78, previously described so that based on the dimensions of the object, by the formula:

$$\frac{\text{Resistor } 108}{\text{Resistor } 113} = \frac{\text{Resistor } 114}{\text{Resistor } 63}$$

the volume thereof will be indicated by such drum in the manner hereinafter to be described.

The bridge B-3 indicates the weight of the object on the scale. To this end, the variable resistor 36 is connected in one arm of such bridge and a fixed resistor 126 is connected in the opposed arm of such bridge. A variable weight resistor 128 is connected in the third arm of such bridge and a second fixed resistor 127 is connected in a fourth arm of such bridge. The variable resister 128 has its contact arm 131 connected to the shaft 132 of servo-motor 95 of bridge B-3 and such arm 131 is connected by lead 133 to contact arm 138 of relay RL-6 ganged to move in unison with arm 118 and which normally engages fixed contact 137 connected by lead 136 to arm 134 of relay RL-7 which normally engages contact arm 135 connected by lead 141 to junction 88 of bridge B-3 so that normally the variable resistor 128 will be connected in such bridge. The arms 118 and 138 of relay RL-6 which normally engage the associated contacts 121 and 137, are spaced from the associated contacts 142 and 143 when the coil 144 of relay RL-6 is not energized. One end of coil 144 is connected to negative main 145 and the other end to arm 146 of density switch 86, the associated fixed contact 147 of which is connected to positive main 148. The shaft 132 of the servo-motor 95 of bridge B-3 is also connected to drum 81 previously described so that the weight of the object will be indicated by such drum 81 in the manner hereinafter to be described.

The bridge B-4, designated the discriminator bridge, determines whether the volume or weight shall control in the rating or charging of the object. To this end, a pair of fixed resistors 151 and 152 are connected in adjacent arms of such bridge B-4. The junction 87 of bridge B-4 is connected by lead 153 to fixed contact 154 of relay RL-8 normally engaged by arm 155 connected by lead 156 to fixed contact 157 of relay RL-7. The junction 88 of bridge B-4 is connected by lead 158 to fixed contact 161 of relay RL-9 normally engaged by contact arm 162 connected by lead 163 to fixed contact 164 of relay RL-7, the arms 123 and 134 of relay RL-7 normally engaging fixed contacts 124, 135 respectively and being spaced from fixed contacts 157, 164 when the coil 165 of relay R-7 is de-energized.

Associated with the discriminator bridge B-4 is the ratio switch 83 which controls resistor banks designated R$a$V and R$a$W which are mounted in housing 21 and such resistor banks are designed to introduce a factor in determining the rating in order to give a greater or lesser rating significance to the volume with respect to the weight than that for which the circuit is normally set, i. e., eight cubic inches to one pound.

The circuit herein is designed to place resistor banks R$a$V and R$a$W in parallel with the fixed resistors 151 and 152, respectively, of the discriminator bridge B-4. To this end, switch 83 desirably has a contact arm 166 normally in zero or neutral position, as shown in Fig. 7. Resistor banks R$a$V and R$a$W each desirably comprises a plurality of resistors, only three of which are shown. Resistors R$a$W-2, R$a$W-3 and R$a$W-4 being at the left and resistors R$a$V-2, R$a$V-3 and R$a$V-4 being at the right. The arm 166 is connected to negative main 145 and in normal or zero position there is no resistor placed in parallel with either fixed resistor 151 or 152. One end of each of the resistors of banks R$a$V and R$a$W is connected to a fixed contact 167 which may be engaged by contact arm 166, the other end of the resistors of banks R$a$W and R$a$V is connected respectively to common leads 168 and 171 which are connected by leads 172 and 173 to junctions 88 and 87 of bridge B-4.

Each of the resistors in resistor banks R$a$V and R$a$W is of such value that when placed in parallel with the associated fixed resistor 151 or 152, it will reduce the effective resistance value of the fixed resistor a predetermined amount. Thus, for example, if the fixed resistor has the value of 100 ohms and a resistor R$a$V or R$a$W placed in parallel therewith has a resistance of 100 ohms, the overall resulting resistance will be 50 ohms.

The shaft 174 of servo-motor 95 of the discriminator bridge B-4 desirably carries a contact arm 175 which, when moved in a counterclockwise direction from the position shown in Fig. 7, will engage a pivoted contact arm 176 connected to positive main 148 to move the arm against fixed contact 177 connected by lead 178 to fixed contact 181 of relay RL-9 which is normally engaged by contact arm 182 connected by leads 183 and 184 to fixed contact 185 of relay RL-8 from which the associated contact arm 186 connected to positive main 148 is normally spaced. In the event that the shaft 174 of the servo-motor 95 of bridge B-4 should rotate the arm 175 in a clockwise direction, no circuit will be completed between arm 176 and fixed contact 177.

The bridge B-5 designated the cost bridge, determines the charge or rating of the object. To this end a pair of fixed resistors 187, 188 are connected in adjacent arms of such bridge B-5. The junction 87 of bridge B-5 is connected by leads 191, 192 and 193 to arms 194 and 195 of relay RL-10 which normally engage fixed contacts 196 and 197 respectively. Contact 196 is connected by lead 198 to the common main 201 of the zone switch 84. As shown in Fig. 7, the zone switch illustratively has a plurality of resistors designated Z-2, Z-3, Z-4, Z-5, any one of which may be placed in circuit to multiply the cost indication by a predetermined multiple in order to give the direct reading for various zones.

One end of each of the resistors Z-2 to Z-5 is connected to common main 201 and the other end of each of the resistors is connected to a contact 202 which may be selecitvely engaged by the switch arm 203, normally in zero or neutral position and connected to negative main 145. Thus by moving the switch arm 203 of the zone switch to engage any of the contacts 202, a resistor will be connected in parallel with fixed resistor 187 of the cost bridge B-5, thereby multiplying the cost indication in the manner hereinafter to be described.

Contact 197 of relay RL-10 is connected by lead 204 to fixed contact 205 of relay RL-9 and by leads 204 and 206 to fixed contact 207 of relay RL-8. The junction 88 of bridge B-5 is connected to the movable contact arm 208 of a variable resistor 211 which is connected in the arm of bridge B-5 opposed to resistor 187 and one end of which is connected to positive main 148. The movable arm 208 of the variable resistor 211 is driven by the shaft 213 of servo-motor 95 which also mounts the drum 75 previously described so that the charge for the object will be indicated.

The bridge B-6 designated the density bridge, determines the density of the object. To this end the junctions 87 and 88 are connected respectively to fixed contacts 214, 215 and 216, 217 of relay RL-13.

The arms 218 and 221 of relay RL-13 are connected respectively by leads 222, 223 to fixed contacts 142 and 143 of relay RL-6. The arms 218, 221 normally engage fixed contacts 217 and 214 and are spaced from contacts 215, 216 when the coil 226 of relay RL-13 is not energized.

One end of coil 226 is connected by lead 229 to arm 282 of relay RL-12 and the other end of the coil is connected by leads 231 and 183 to arm 182 of relay RL-9.

Thus, when the relay RL-6 is energized and relay RL-13 is de-energized, the volume and weight resistors 114 and 128 of bridges B-2 and B-3 will be connected in bridge B-6 opposed to fixed resistor 232 and variable balancing resistor 233 respectively.

The shaft 234 of servo-motor 95 of bridge B-6 which controls the arm 235 of variable resistor 233 also controls the indicator 82 on which the density of the package may be shown.

In order to control the operation of the equipment in a predetermined timed sequence, a timer 237 is provided which, as shown in Fig. 7, desirably comprises a plurality of discs of conducting material designated 238, 239, 240, 241, 242, 243, 244, all affixed on a shaft 245 also of conducting material which is driven by a motor M, one of the inputs of which is connected to negative main 145.

Each disc has a wiper arm 246, 247, 248, 249, 250, 251 and 252 associated therewith respectively and adapted to engage the periphery of the associated disc. The discs 238 to 243 inclusive have notches 253 of different lengths in their periphery in which the wiper arms are normally positioned to break the circuit from the wiper arm to the associated disc and disc 244 is continuously engaged by its associated wiper 252 which is connected by lead 254 to positive main 148. Wiper arm 246 is connected by lead 255 to the other input of motor M and to movable arm 256 of start switch 85 which is normally spaced from fixed contact 257 connected to positive main 148.

Wiper arm 247 is connected by lead 258 to one side of the coils 101 of relays RL-1, RL-2 and RL-3, the other side of said coils being connected to negative main 145. Wiper arm 247 is also connected by lead 259 to fixed contact 261 of relay RL-11, the associated contact arm 262 of which is connected to positive main 148, being normally spaced from said fixed contact 261 when coil 263 is de-energized. Wiper arm 248 is connected by lead 264 to one side of the coil 165 of relay RL-7, the other side of said coil being connected to negative main 145. Wiper arm 249 is connected by lead 265 to one side of the coil 101 of relay RL-4, the other side of said coil being connected to negative main 145.

Wiper arm 250 is connected by lead 266 to contact arm 267 of relay RL-8 which normally engages fixed contact 268 when coil 271 of relay RL-8 is de-energized. Contact 268 is connected by lead 272 to fixed contact 273 of relay RL-9, the associated contact arm 274 of which, is normally spaced from contact 273 when coil 275 of said relay RL-9 is de-energized. Contact 268 is also connected by leads 272 and 276 to one side of the coil 275, the other side of which is connected by leads 277 and 278 to one side of coil 271 of relay RL-8 and by leads 277 and 281 to contact arm 282 of relay RL-12 which normally engages fixed contact 283 connected to negative main 145 when the coil 284 of the relay is de-energized. The other side of coil 271 of relay RL-8 is connected by lead 285 and leads 183 and 184 to arm 182 of relay RL-9 and fixed contact 185 of relay RL-8 respectively.

The relay RL-8 has an arm 286 connected to positive main 148 and normally spaced from fixed contact 287 connected through lamp 288 to negative main 145 and the relay RL-9 has an arm 291 connected to positive main 148 and normally spaced from fixed contact 292 connected through lamp 293 to negative main 145.

Wiper arm 251 of timer 237 is connected by lead 294 to one side of the coil 101 of relay RL-5, the other side of said coil being connected to negative main 145. The wiper arm 251 is also connected by lead 294 to fixed contact 295 of relay RL-11, the associated arm 296, which is connected to positive main 148, being normally spaced from said fixed contact. One side of coil 263 of relay RL-11 is connected to negative main 145 and the other side of said coil is connected by lead 297 to one side of the coil 298 of relay RL-10, the other side of said coil being connected to negative main 145; by leads 297 and 301 to arm 302 of resetting switch 90, which arm is normally spaced from fixed contact 304 connected to positive main 148, and by lead 297 to one side of coil 284 of relay RL-12, the other side of which is connected to negative main 145.

The relay RL-10 has three fixed resistors 305, 306, 307 designated the volume zero, the weight zero and the cost zero resistor, respectively. One end of each of said resistors is connected to positive main 148, and the other ends of said resistors are connected, respectively, to fixed contacts 308, 311 and 312, from which the associated contact arms 313, 314 and 195 are normally spaced.

Contact arm 313 of relay RL-10 is connected by lead 315 to junction 87 of bridge B-2. Fixed contact 316 of relay RL-10 normally engaged by arm 313 is connected by lead 317 to arm 111 of resistor 108 of bridge B-2 so that only when arm 313 of relay RL-10 is engaging fixed contact 316 will resistor 108 be connected in an arm of bridge B-2.

Contact arm 314 of relay RL-10 is connected by lead 318 to junction 87 of bridge B-3. Fixed contact 321 of relay RL-10, normally engaged by arm 314, is connected by lead 322 to arm 323 of resistor 36 of bridge B-3 so that only when arm 314 of relay RL-10 is engaging fixed contact 321 will resistor 36 be connected in an arm of bridge B-3.

Operation

In order to determine the rating of an object, including its volume, weight and the cost to be charged for shipping the same, the object or package is first placed on platform 38 adjacent the origin O of the three-dimensional system of rectangular coordinates and the measuring members 46, 47 and 48 are moved to engage the end, side and top of the package respectively.

Assuming for purposes of illustration, that the package is 2″ x 2″ x 2″ and weighs one pound and the ratio switch 83 and zone switch 84 are in neutral position as shown in Fig. 7, movement of the measuring members 46, 47 and 48 through the transmission from sprocket chains 73 and sprocket wheels 66, 67 will set the associated variable resistor 63 in bridge B-2 and resistors 64 and 65 in bridge B-1, to ohmic values related to a length, width and height of 2″ x 2″ x 2″ respectively, i. e., 2 ohms by 2 ohms by 2 ohms in the illustrative embodiment herein described.

The weight of the package on platform 38 will set variable resistor 36 in bridge B-3 to an ohmic value related to the weight of one pound, i. e., eight ohms in the illustrative embodiment herein shown and described.

When the frame 37 carried by the weighing scale is at rest, the operator may actuate start switch 85 mounted on the front panel of the housing to bring contact arm 256 into engagement with fixed contact 257. As a result, a circuit will be completed from main 148 through closed contacts 257, 256 to one side of the timer motor M and from the other side of the motor to negative main 145.

Energization of motor M will, through shaft 245 rotate timer discs 238 to 244 inclusive in a counterclockwise direction from the position shown in Fig. 7. After a short interval of time, the notch 253 in disc 238 will move past wiper arm 246 which then engages the periphery of said disc to complete a holding circuit for the motor M so that when switch 85 is released, the motor M will remain energized. The holding circuit is from negative main 145 to one side of motor M and from the other side of the motor through lead 255, wiper arm 246, disc 238, conducting shaft 245, disc 244, wiper arm 252 which continuously engages disc 244 and lead 254 to positive main 148.

Further rotation of the shaft 245 by motor M will cause the notch 253 in disc 239 to move past wiper arm 247 which then engages the periphery of disc 239. As a result a circuit will be completed to the coils 101 of relays RL-1, RL-2 and RL-3. This circuit is from positive main 148, lead 254, wiper arm 252, disc 244, shaft 245, disc 239, wiper arm 247 to main 258 to which one side of all of the coils 101 are connected and from the other side of said coils to negative main 145.

Energization of coils 101 of said relays RL-1, RL-2 and RL-3 will close the respective contacts 97, 98. As a result, the output of the servo-amplifiers 91 of bridges B-1, B-2 and B-3 will be connected to energize the respective associated servo-motors 95.

Referring to bridge B-1, if the resistor 104 has a value of one ohm, as resistors 64 and 65 each has been set to a value of two ohms related to the width and height of the object, by the formula:

$$\frac{\text{width resistor } 64}{\text{resistor } 104} = \frac{\text{variable resistor } 105}{\text{height resistor } 65}$$

the resistor 105 must assume the value of the end area, illustratively four ohms, in order for the bridge B-1 to be in balance.

As is clearly shown in the drawings, the shaft 107 of the servo-motor 95 of bridge B-1 is connected by shaft 112 to the wiper arm 111 of resistor 108 in bridge B-2. Consequently, such resistor 108 will also become set to the value of the end area entered in resistor 105 of bridge B-1.

Assuming that the resistor 113 of bridge B-2 also has a value of one ohm, and as the length resistor 63 has been set to a value of two ohms as previously described, by the formula:

$$\frac{\text{Resistor } 108}{\text{Resistor } 113} = \frac{\text{Resistor } 114}{\text{Resistor } 63}$$

the resistor 114 will assume a value of the volume, illustratively eight ohms, in order for the bridge B-2 to be in balance.

The drum 78 driven from the servo-motor 95 of bridge B-2 will indicate the volume (illustratively 8 cubic inches) under control of said bridge.

Assuming that the resistors 126, 127 of the weight bridges are of equal value, as the weight resistor 36 has been set to a value of eight ohms, due to the weight of one pound on the scale, if the value of resistor 128 is greater or less than eight ohms, the bridge B-3 will not be in balance and current will flow into servo-amplifier 91. When that bridge reaches balance, servo-motor 95 through shaft 132 will rotate the contact arm 131 of resistor 128 and also rotate drum 81 to indicate the weight value, illustratively one pound which is correlated with the resistance of 8 ohms.

Thus, the circuit has operated to give a reading of volume and weight on drums 78 and 81, respectively.

Continued rotation of shaft 245 by motor M in a counterclockwise direction will cause the notch 253 in disc 239 to reach wiper arm 247 and break the circuit to the coils 101 of relays RL-1, RL-2 and RL-3. The de-energization of such coils will open the associated contacts 97 and 98 to disconnect the servo-motors 95 of bridges B-1, B-2 and B-3 from the associated servo-amplifiers. Thus, there is no likelihood of creeping of the servo-motors due to stray currents in the circuit from the associated servo-amplifier and hence the contact arms of resistors 105, 114 and 128 will remain at the setting previously attained, as will the drums 78 and 81.

Substantially simultaneously with the de-energization of relays RL-1, RL-2 and RL-3, the notch 253 in disc 240 will move past wiper arm 248 which then engages the periphery of disc 240. As a result, a circuit is completed from positive main 148, lead 254, wiper arm 252, disc 244, conducting shaft 245, disc 240, wiper arm 248, lead 264 to one side of the coil 165 of relay RL-7 and from the other side of the coil to negative main 145. Relay RL-7 will thus be energized and the arms 123 and 134 thereof will engage fixed contacts 157 and 164, respectively.

This will complete a circuit from positive main 148 connected to bridge B-2, through volume resistor 114 which has been set in the illustrative example to eight ohms, arm 115, lead 117 to arm 118 of relay RL-6, fixed contact 121, lead 122, arm 123 of relay RL-7, fixed contact 157, lead 156, arm 155 of relay RL-8, fixed contact 154, lead 153 to junction 87 of discriminator bridge B-4. Similarly a circuit will be completed from positive main 148 connected to bridge B-3 through weight resistor 128 which has been set in the illustrative example to a value of eight ohms, movable arm 131, lead 133, arm 138 of relay RL-6, fixed contact 137, lead 136, arm 134 of relay RL-7, fixed contact 164, lead 163, arm 162 of relay RL-9, contact 161, lead 158 to junction 88 of discriminator bridge B-4. Thus, the volume resistor 114 and weight 128 will be connected in two arms of the discriminator bridge B-4 opposed respectively to fixed resistors 152 and 151.

Simultaneously with the engagement of wiper arm 248 by the periphery of disc 240, the periphery of disc 241 will engage a wiper arm 249 to complete a circuit from positive main 148 to energize coil 101 of relay RL-4. As a result, contacts 97, 98 of relay RL-4 will close to connect the output of servo-amplifier 91 of bridge B-4 to servo-motor 95. As the volume and weight resistors 114 and 128 have equal value (eight ohms in the illustrative example) the discriminator bridge B-4 will be in balance and hence no current will flow into the servo-amplifier 91 and the servo-motor 95 will remain de-energized. Consequently, the switch contacts 176, 177 will remain open. As a result, the relay RL-8 will remain de-energized, for no current will flow through its coil 271.

At this time the motor M will have rotated the disc 242 so that its periphery will engage wiper arm 250 to complete a circuit from positive main 148, lead 254, wiper arm 252, disc 244, shaft 245, disc 242, wiper arm 250, lead 266 to movable arm 267 of relay RL-8, fixed contact 268 to one side of coil 275 of relay RL-9 and from the other side of said coil, leads 277 and 281 through closed contacts 282, 283 of relay RL-12 to negative main 145.

As a result, coil 275 of relay RL-9 will be energized and ganged arms 162, 291 and 274 thereof will engage fixed contacts 265, 292 and 273, respectively, and arm 182 will move away from fixed contact 181. When movable arm 162 engages fixed contact 265, a circuit will be completed from positive main 148 through the weight resistance 128 of bridge B-3, wiper arm 131, lead 133, movable arm 138 of relay RL-6 which is engaging fixed contact 137, lead 136 to movable arm 134 of relay RL-7, fixed contact 164, lead 163 to arm 162 of relay RL-9, contact 265 engaged thereby, lead 204, contacts 197, 195 of relay RL-10, lead 193, 191 to junction 87 of cost bridge B-5, thereby connecting the weight resistance in one arm of said cost bridge.

When arm 291 which is connected to positive main 148 engages fixed contact 292 of relay RL-9, a circuit will be completed to lamp 293 so that the latter will be illuminated to indicate that the weight is the controlling parameter which is determining the cost. When movable armb 274 which is also connected to positive main 148 engages fixed contact 273, a holding circuit will be provided for relay RL-9 to maintain the latter energized.

At this time the periphery of disc 243 will engage its wiper arm 251 to complete a circuit from positive main 148, lead 254, wiper arm 252, disc 244, shaft 245, disc 243, wiper arm 251, lead 294 to one side of the coil 101 of relay RL-5 to energize the latter. As a result contacts 97, 98 of relay RL-5 will close to connect the output of servo-amplifier 91 of bridge B-5 to servo-motor 95.

At this time, the periphery of disc 241 will have moved away from its wiper arm 249 to break the circuit to coil 101 of relay RL-4. As a result, the circuit to the servo-motor 95 of the discriminator bridge B-4 will be broken to prevent creeping of said motor which might otherwise cause rotation of shaft 174 with possible closing of contact 176, 177.

As in the illustrative example, the package has a weight of one pound which is equivalent to the resistance of eight ohms, the drum 75 driven from the servo-motor 95 of bridge B-5 will indicate the cost (illustratively five cents which is the charge for one pound).

Continued rotation of shaft 245 by motor M in a counterclockwise direction will cause the notch 253 in disc 243 to reach wiper arm 251 at which time relay RL-5 will be de-energized to cause its contacts 97, 98 to open thereby breaking the circuit to servo-motor 95 of the cost bridge B-5 so that the drum 75 will remain in set position indicating the cost previously determined.

After the disc 238 has made substantially a complete revolution, the notch 253 therein will reach the wiper arm 246 to break the circuit to motor M and the equipment thereupon will be rendered inoperative with the drums 78, 81 and 75 indicating the volume, weight and shipping cost of the package.

In order to determine the density or the relation of weight to volume of the package being shipped after it has been rated, as above described, it is merely necessary for the operator to actuate the density switch 86. This will energize relay RL-6 to bring arms 118 and 138 into engagement with fixed contacts 142 and 143.

As a result, a circuit will be completed from positive main 148, resistor 114 of volume bridge B-2, lead 117, contacts 118, 142 of relay RL-6, lead 222, closed contacts 218, 217 of relay RL-13 to junction 88 of density bridge B-6. Similarly, a circuit will be completed from positive main 148, resistor 128 of weight bridge B-3, lead 133, contacts 138, 143, lead 223, closed contacts 221, 214 to junction 87 of density bridge B-6.

The output of bridge B-6 is the quotient of the weight divided by the volume and such output will be indicated on meter 82 as a factor of density.

As the resistors 114 and 128 are of identical value (eight ohms for a volume of eight cubic inches and a weight of on pound) the currents through such resistors will be identical and the density bridge B-6 would be in balance, the meter being illustratively designed to give an arbitrary indication of "one" which would indicate that the weight and the volume bear a predetermined relation to each other, i. e., 8 cubic inches to one pound.

If the weight current should be less than the volume current, i. e., if the weight of the object is say two pounds and the volume eight cubic inches, the meter would give an indication of the correct density greater than one and if the volume current should be greater than the weight current, the meter would give an indication of the correct density less than one.

As the relay RL-8 has not been energized, the contacts 186, 185 are open and hence coil 226 of relay RL-13 is not energized and its contacts will be in the position shown. If the relay RL-8 is energized, which will occur when volume controls the rating of the object, the closing of its contacts 186, 185 will cause relay RL-13 to be energized so that the weight and volume resistors will be switched from opposing resistors 233 and 232 respectively to oppose resistors 232 and 233 respectively. Consequently, the meter 236 will always indicate in one direction.

At this time, if desired, the drums 78, 81 and 75 may be returned to zero position by merely actuating resetting switch 90. As the result of the closing of contacts 302, 304, a circuit will be completed from positive main 148 through the closed contacts 304, 302 and the coil 298 of relay RL-10 to negative main 145 to energize such relay so that its arms 195, 314, and 313 will move away from contacts 197, 321, and 316 and engage contacts 312, 311 and 308 and arm 194 will move from contact 196. In addition, the closing of switch 90 will complete a circuit from positive main 148, through the coils 284 and 263 of relays RL-12 and RL-11 to negative main 145 to energize such relays.

When relay RL-12 is energized, contacts 282, 283 will open to break the circuit from negative main 145 through leads 281, 277 to coil 275 of relay RL-9. Consequently, relay RL-9 will be de-energized and arms 274 and 291 will move away from contacts 273 and 292. As a result, the holding circuit for coil 275 will be broken and lamp 293 will go out.

When relay RL-11 is energized, and its contact arms 262 and 296 engage fixed contacts 261 and 295, the relays RL-1, RL-2, RL-3 and RL-5 will be energized to complete circuits to the servo-motors of bridges B-1, B-2, B-3 and B-5 as previously described.

When arm 195 of relay RL-10 engages fixed contact 312, a circuit will be completed from positive main 148, through cost zero resistance 307, closed contacts 312, 195, lead 193, 191, to junction 87 of the cost bridge B-5 thereby connecting the cost zero resistance 307 in one arm of the brdige.

When arm 314 engages fixed contact 311, a circuit will be completed from positive main 148, through weight zero resistance 306, closed contacts 311, 314, lead 318 to junction 87 of the weight bridge B-3 thereby connecting the weight zero resistance 306 in one arm of the weight bridge.

When movable arm 313 engages fixed contact 308, a circuit will be completed from positive main 148, through volume zero resistance 305, closed contacts 308, 313, lead 315 to junction 87 of the volume bridge B-2 thereby connecting the volume zero resistance 305 in one arm of said volume bridge.

As previously described, the volume bridge B-2, weight bridge B-3 and cost bridge B-5 have been readied for actuation by the closing of switch 90. The value of volume zero resistance 305, weight zero resistance 306 and cost zero resistance 307 are calibrated with the zero point on each related drum. Consequently, the volume bridge, the weight bridge and the cost bridge which initially had their volume, weight and cost resistors 114, 128 and 211 respecttively set to the readings set forth, will be unbalanced and current will flow into the associated servo-amplifier 91 to energize the associated servo-motor 95 which will thereupon rotate the associated wiper arms 115, 131 and 208 until the bridges are in balance by which time the drums controlled by the shafts of the servo-motors 95 will have turned to zero position.

When such zero position has been reached, resetting switch 90 is released and the equipment will thereupon be ready for the next weighing operation.

If the package should have a volume of eight cubic inches and the weight should be, for example, two pounds, the drum 78 would rotate to indicate a volume of 8 cubic inches and the drum 81 would rotate to indicate a weight of two pounds. As the value of the weight resistor 128 is 16 ohms for a weight of two pounds, and the value of the volume resistor 114 is 8 ohms for a volume of 8 cubic inches, the discriminator bridge B-4 would be unbalanced and current would flow into the servo-amplifier 91. Due to the fact that the weight resistor is greater than the volume resistor, the weight current would be less than the volume current and the servo-motor 95 of bridge B-4 will be rotated in a clockwise direction so that the switch arm 175 thereof will have no effect on the movable arm 176.

As the result, in the manner previously described, the weight resistor 128 will form one of the arms of the cost bridge B-5. Consequently, the servo-motor of the cost bridge will rotate the wiper arm 208 until that portion of cost resistor 211 is placed into circuit of ohmic value equal to 16 ohms and the drum 75 mounted on the shaft of such servomotor will indicate a cost indication controlled by weight of say, 10 cents.

If the object being measured should be 2" by 2" by 4" or 16 cubic inches and the weight should be one pound, the volume resistor 114 which has a value of 16 ohms for a volume of 16 cubic inches, and the weight resistor 128 which has a value of 8 ohms for a weight of one pound are placed in the discriminator bridge B-4, as previously described, so that the current through the volume resistor would be less than that through the weight resistor. Consequently, the discriminator bridge would be unbalanced, but this time the current into the servo-amplifier 91 will be in direction to rotate the servo-motor 95 in a counterclockwise direction and arm 175 would engage contact arm 176 to move the latter into engagement with fixed contact 177.

As the result, a circuit will be completed from positive main 148, closed contacts 176 and 177, lead 178, contact 181 of relay RL-9, movable arm 182, leads 183, 285 to one side of the coil 271 of relay RL-8 and from the other side of the coil of said relay, lead 278, 281, through closed contacts 282 and 283 of relay RL-12 to negative main 145. As a result of the energization of relay RL-8, its movable arms 286, 186 and 155 will engage fixed contacts 287, 185 and 207 and arm 267 will move from contact 268.

When arm 286 engages contact 287, a circuit will be completed from positive main 148, through contacts 286 and 287 to one side of lamp 288 and from the other side of said lamp to negative main 145. Thus, the lamp 288 will be illuminated to indicate that the volume is the controlling factor in determining the rating of the package.

When arm 186, which is connected to positive main 148 engages fixed contact 185, a holding circuit will be provided for the coil 271 of relay RL-8. Thus, even if arm 175 should disengage arm 176 of the discriminator switch, relay RL-8 will remain energized.

When arm 155 engages fixed contact 207, a circuit will be provided from positive main 148, through volume resistor 114 of bridge B-2, arm 115 engaging such resistor, which illustratively has a value of 16 ohms for a volume of 16 cubic inches, lead 117, arm 118 and fixed contact 121 of relay RL-6, lead 122, arm 123, which is now engaging contact 157, lead 156 to arm 155 of relay RL-8, contact 207, leads 206, 204, closed contacts 197, 195 of relay RL-10, leads 193 and 191 to junction 87 of cost bridge B-5, thereby connecting the volume resistor 114 to said cost bridge.

As the value of the volume resistor placed in the bridge B-5 is 16 ohms, if the value of resistor 211 is greater or less than 16 ohms, the cost bridge will be out of balance and current will be fed to servo-amplifier 91. As a result, servo-motor 95 will be energized to rotate the wiper arm 208 and the drum 75 carried thereby until such wiper arm engages that portion of resistor 211 to place 16 ohms in circuit, at which time the cost bridge will be in balance and no current will flow through servo-amplifier 91.

Consequently, servo-motor 95 and the drum 75 controlled thereby will stop rotating. The drum is so calibrated that when it is thus stopped rotating, a suitable pointer will indicate a cost of ten cents correlated with a volume of 16 cubic inches.

As previously described, when the discs 240 and 243 have been rotated so that the notches therein are aligned with the associated wiper arms, the circuit to the coils of relays RL-1, RL-2, RL-3 and RL-5 will be broken and the contacts of such relays will be opened to de-energize the servo-motors of bridges B-1, B-2, B-3 and B-5. As a result, the volume, the weight and the cost indication will remain at the previously determined figure, and by reason of the holding circuit for relay RL-8, the lamp 288 will remain illuminated indicating that the volume is the controlling factor in determining the cost at this time.

After the values have been read, the equipment may be zeroed by actuating switch 90 and the operation previously described will return all of the drums to zero position and recycle the equipment so that it is ready for the next operation.

The operation thus far described has been with respect to the predetermined relation of 8 cubic inches to one pound with a charge of five cents for each 8 cubic inches or one pound. Where it is desired to allow the shipper to transport double the volume for a given weight for the same price, that is, 16 cubic inches for five cents, before start switch 85 is actuated, it is merely necessary for the operator to adjust ratio switch 83 so that switch arm 166 thereof engages the contact 167 associated with resistor $R_aW-2$. This will place resistor $R_aW-2$ which has a value of one ohm in parallel with resistor 152 of discriminator bridge B-4 which also has a value of one ohm.

Thus, the effective value of resistor 152 and resistor RaW–2 will be equal to one-half ohm. From the formula $$\frac{\text{Volume Resistor 114}}{\text{Resistor 151}} = \frac{\text{Weight Resistor 128}}{\text{Parallel Resistors 152, RaW-2 (one-half ohm)}}$$

it is apparent that with a volume of 16 cubic inches and a weight of one pound, the discriminator bridge will still be in balance, even though the volume of the object is 16 cubic inches (16 ohms) and its weight equals one pound (8 ohms).

With the bridge in balance, when the periphery of disc 242 engages wiper arm 250, as previously described, relay RL–9 will be energized and lamp 293 will become illuminated to indicate that the weight is the factor in determining the cost. The weight resistor 128 of the bridge B–3 will be connected in the cost bridge B–5 and the cost drum 75 will be rotated as previously described to indicate a value of five cents related to a weight of one pound.

Similarly, if it is desired to allow the shipper to transport up to but not including double the weight for a given volume for the same price, that is, up to but not including two pounds for five cents with a relation such as 8 cubic inches to one and one-half pounds between volume and weight, it is a simple matter for the operator to adjust the ratio switch 83 so that the movable arm 166 thereof engages fixed contact 167 associated with the resistance RaV–2, which has a value of one ohm, to place the latter in parallel with resistor 151 in bridge B–4, which also has a value of one ohm. From the formula:

$$\frac{\text{Volume Resistor 114}}{\text{Resistor 151 in parallel with RaV-2 (one-half ohm)}} = \frac{\text{Weight Resistor 128}}{\text{Resistor 152}}$$

it is apparent that the bridge will be unbalanced.

Due to the predominance of the current through the weight leg of the bridge B–4 over that through the volume leg of the bridge, servo-motor 95 of the discriminator bridge B–4 will be energized in direction to rotate the shaft 174 in a counterclockwise direction so that the arm 175 will engage arm 176 to move the latter against contact 177 to complete a circuit to the coil of relay RL–8 as previously described; lamp 288 will be illuminated to indicate that the volume factor is controlling in determining the cost. The volume resistor 114 which has a value of 8 ohms, for a volume of 8 cubic inches, will be connected in the cost bridge B–5, and the servo-motor 95 of such bridge will rotate the wiper arm 208 and the drum 75 until that portion of resistor 211 is placed in circuit equal to a value of 8 ohms at which time the bridge will be in balance. The drum 75 of such bridge will thereupon indicate a value of five cents related to a volume of 8 cubic inches and such charge will be given even though the weight of the object is, for example, one and one-half pounds.

In the event, however, an object being rated should have a relation between volume and weight, equal to or greater than 8 cubic inches to two pounds respectively, the discriminator bridge with the addition of resistance RaV–2 in parallel with the resistor 151 will be balanced when the relation is equal to 8 cubic inches to two pounds, or unbalanced in favor of weight when the relation is changed, i. e., 8 cubic inches to three pounds. In either case, the weight resistor 128 will be placed into the cost bridge B–5 as previously described and the cost drum 75 will indicate ten cents or 15 cents as the case may be, based on the weight of the object.

With the zone switch 84 in the neutral position, shown in Fig. 7, the current flowing in the cost bridge will depend solely on the value of the volume resistor 114 or the weight resistor 128, whichever is in circuit. If, for example, the weight resistor is in circuit, and a weight of one pound results in a resistance of 8 ohms on the weight resistor 128, the cost drum 75 will rotate to give an indication of five cents. If it is desired to double the rate in the event the package is to be shipped to a second zone further away, it is a relatively simple matter to move the contact arm 203 of the zone switch to engage the contact 202 associated with the resistance Z–2 which has a value of one ohm so that the latter will be put in parallel with the resistor 187 of the cost bridge B–5 (which also has a value of one ohm). The circuit is from negative main 145, arm 203, resistance Z–2, main 201, lead 198, fixed contact 196 of relay RL–10, arm 194, leads 192, 191 to junction 87 of the cost bridge.

From the formula:

$$\frac{\text{Resistor 128}}{\text{Resistor 187 in parallel with Z-2 (one-half ohm total)}} = \frac{\text{Resistor 211}}{\text{Resistor 188 (one ohm)}}$$

it is apparent that the cost bridge will be unbalanced and the servo-motor will turn the wiper arm of resistor 211 until 16 ohms of resistor 211 is in circuit to balance the bridge. At such time the drum 75 will indicate a charge of ten cents or double the rate. Similarly, the charge may be multiplied by three, four, etc. as desired by having the zone resistances Z–3, Z–4, etc. of values equal to one-half ohm, one-third ohm and so on.

In the embodiment above described, the cost is determined either by weight or by volume depending upon the ratio factor introduced by the setting of switch 83.

In the embodiment of Fig. 8, the cost is based essentially on one parameter, illustratively weight with an added premium for a second parameter, illustratively volume.

The bridges B–1', B–2' and B–3' shown in Fig. 8 are identical to bridges B–1, B–2 and B–3 of Fig. 7 and corresponding parts have the same reference numerals primed. In the manner previously described, the resistor 114' is set to a value proportional to the volume of the object and the resistor 128' is set to a value proportional to the weight of the object.

The shafts 116' and 132' of the servo-motors 95' of bridges B–2' and B–3' which control resistors 114' and 128' also control the input shafts 331 and 332 of a mechanical differential unit 333 such as the type put out by Belock Instrument Corporation.

The output shaft 334 of the differential unit 333 will be rotated to a position related to the sum of the weight and volume inputs and drives the wiper arm 335 of a variable resistor 336 in a cost bridge B–5' similar to bridge B–5 in Fig. 7. The bridge B–5' has a pair of fixed resistors 187' and 188' and a variable resistor 211', the wiper arm 208' of which is driven by the shaft 213' of servo-motor 95' as is an indicator 75'. The bridge B–5' has associated therewith a plurality of zone resistors Z–2', Z–3', etc. which may be connected in parallel with resistor 187'.

As the variable resistors 114' and 128' are illustratively 10 turn units, appropriate gearing is associated with the input shafts 331, 332 and output shaft 334 of differential unit 333 so that based upon the number of turns imparted to the shafts 331, 332, the shaft 334 will turn a corresponding amount. In addition, appropriate gearing is also associated with the shaft 213' driving indicator 75' as the resistor 211' also is illustratively a 10 turn unit.

To illustrate the operation of the circuit shown in Fig. 8, it will be assumed that resistor 128' is calibrated so that 10 turns represents a weight of 100 pounds and resistor 114' is calibrated so that 10 turns represents a volume of 10 cubic feet and the charge is to be based upon a rate of 10 cents per pound with an added premium of 10 cents per cubic foot.

Thus, in terms of cost, one turn of the weight resistor 128' equals 10 turns of the volume resistor 114' and a gear ratio unit 341 which may have a ratio of 10 to 1 is introduced between the shaft 116' of the servo-motor 95' of bridge B-2' and the input shaft 331 of differential unit 333.

If a package having a weight of 50 pounds and a volume of 2 cubic feet is placed on the platform 38, in the manner previously described, the movable arm of resistor 128' will rotate five turns and the movable arm of resistor 114' will rotate two turns. Consequently, the input shaft 332 of the differential unit 333 driven by the servo-motor 95' of the weight bridge B-3' will rotate five turns and the input shaft 331 of the differential unit 333 driven by the servo-motor 95' of the volume bridge B-2' will rotate .2 of a turn by reason of gear unit 341.

Thus, the output shaft 334 of the differential unit 333 will rotate 5.2 turns which is related to a cost of $5.20 ($5.00 for weight of 50 pounds and 20¢ for the volume of two cubic feet) and the movable arm 335 of resistor 336 will also rotate 5.2 turns.

The bridge B-5' will operate in the manner previously described with respect to bridge B-5 and the movable arm 208' of resistor 211' will also turn 5.2 turns and the indicator 75' through the associated gearing will become set to a value of $5.20.

If there is only one zone or the cost indicator 75' is calibrated directly in zones, then bridge B-5' can be eliminated and the output shaft 334 of the differential unit can directly drive the cost indicator through appropriate gearing.

The value of the added premium due to the volume of the package can be changed by changing the gear ratio of unit 341. Thus, if it is desired to charge a premium of 20 cents per cubic foot then the gear ratio would be 5 to 1 so that two cubic feet would cause the input shaft 331 of the differential unit driven by the volume bridge B-2' to rotate .4 of a turn to add a cost of 40 cents.

If it is desired to have either or both of the weight or volume charges in fixed steps for given increments of weight and volume, conventional stepping relays could be used to control the setting of the input shafts of differential unit 333 or if desired, the resistors 114' and 128' could be stepped resistors rather than continuously wound resistors.

It is also apparent that the embodiment shown in Fig. 8 could use the volume for the basic charge and add premiums for increments of weight.

In the embodiments shown in Fig. 9 which is similar to that shown in Fig. 8 with the added feature of a discriminator unit, in addition to the cost being determined by one or the other of two parameters, a premium is added for the non-selected parameter.

In this embodiment, in addition to the differential unit 333', which is designed for subtraction between the inputs thereto, differential units 345 and 346 are also provided.

The differential unit 333' forms part of a discriminator unit and its output shaft 334 controls the movable arm 347 of a discriminator switch 348 and is connected to positive main 148'. The switch 348 may comprise two spaced arcuate segments 351 and 352 either of which may be engaged by arm 347. The segment 351 is connected by lead 353 to one side of the coil 354 of cost relay 355, the other side of which is connected to negative main 145'. The relay 355 has an arm 356 connected to junction 87' of cost bridge B-5" and which normally engages fixed contact 357 connected by lead 358 to arm 359 of a variable resistor 361 connected at one end to positive main 148'. The fixed contact 362 of the relay is connected by lead 363 to arm 364 of a variable resistor 365, the other end of which is connected to positive main 148'.

As the cost bridge B-5" is identical to bridge B-5' shown in Fig. 8, it will not be described.

The servo-motor 95' of volume bridge B-2" drives input shafts 371, 372 and 373 of differential units 333', 345, 346 and the servo-motor 95' of weight bridge B-3" drives input shafts 374, 375 and 376 of said differential units respectively, and the output shafts 377, 378 of units 345, 346 drive the movable arms 364, 359 respectively of variable resistors 365, 361.

The equipment shown in Fig. 9 is designed to charge by either volume or weight, with any given ratio, and suitable gear ratio units 381 and 382 are operatively connected between servo-motor 95' and the associated input shafts 371, 372, 373 and 374, 375 and 376 of the differential units 333', 345 and 346.

In order that a charge may be made for volume with an added premium for weight and for weight with an added premium for volume, suitable gear ratio units 383, 384 are operatively connected to the shafts 375, 373 of differential units 345, 346.

To illustrate the operation of the embodiment shown in Fig. 9, it will be assumed that the resistors 114" and 128" are 10 turn resistors and that 100 pounds and 10 cubic feet are related to 10 turns of the associated resistor.

Thus, if the object weighs 10 pounds and has a volume of one cubic foot, if the gear units 381, 382 are set to 1 to 1 ratio, as the differential 333' is designed to give the difference between the inputs thereto, the shaft 334 will remain in the neutral position shown.

Assuming, that if volume controls, it is desired to add a premium of 5 cents per pound, the gear unit 383 is set to a ratio of 2 to 1 and if weight controls it is desired to add a premium of 25 cents per cubic foot, the gear unit 384 is set to a ratio of 4 to 1.

Thus, the sum of the inputs to differential unit 345 will cause the movable arm 364 of resistor 365 to rotate 1½ times (1 turn for a volume of 1 cubic foot and ½ turn for a weight of 10 pounds) and the sum of the inputs to differential unit 346 will cause the movable arm 359 of resistor 361 to rotate 1¼ turns (1 turn for a weight of 10 pounds and ¼ turn for a volume of 1 cubic foot).

When the cost bridge B-5" is actuated, as relay 355 will not be energized due to the neutral position of switch 348, the weight resistor 361 will be connected into the cost bridge. As previously described, when the cost bridge is balanced, the servo-motor 95' thereof will have rotated the movable arm of resistor 211" 1¼ turns corresponding to the setting of resistor 361 and the indicator 75" will show a cost of $1.25.

If the volume of the package should be 2 cubic feet and the weight 10 pounds, the output shaft of differential unit 333' will rotate arm 347 in a clockwise direction to engage segment 351. The arm 364 of resistor 365 will rotate 2½ times and the arm 359 of resistor 361 will rotate 1½ turns.

As relay 35g will be energized due to the circuit completed through segment 351, the arm 356 will engage fixed contact 362 to connect resistor 365 in cost bridge B-5". As a result, a cost indication of $2.50 will be shown on indicator 75".

If it is desired to change the ratio of weight to volume so that, for example, the basic charge for 10 pounds and 2 cubic feet will be the same, i. e., $1.00, the gear unit 381 is set to a 2 to 1 ratio.

Thus, with a weight of 10 pounds and a volume of two cubic feet, the arm 347 of switch 348 will remain in neutral position and arm 364 of resistor 365 will turn 1½ turns and arm 359 of resistor 361 will turn 1¼ turns.

Consequently, as the weight resistor 361 will be in circuit as previously described, the cost indicator will show $1.25.

The examples thus given of the operation of the embodiments shown in Figs. 8 and 9 are merely illustrative and it is to be understood that by the use of additional gear ratio units at appropriate places, various combinations of charges can be made.

The embodiment of the equipment shown in Fig. 10 is designed to rate objects or packages so as to take into account those cases where the dimensions of the object or package render it difficult to handle or it is difficult to accommodate relative to its weight. In this embodiment, three parameters of the object are determined and based upon the value of one of these parameters one or the other of the two remaining parameters is selected to determine the rating of the object.

As illustratively shown in Fig. 10, two of the parameters are weight and volume and such parameters may be determined by equipment similar to that shown in Fig. 1. Thus, the weight of the object determined by a suitable weighing scale is set into one arm of a bridge B–7 and by means of a servo-system comprising a servo-motor 401 and a servo-amplifier 402, a balancing resistor 403 is set to a value proportional to that of the weight resistor 404.

In addition, the servo-motor 401 also sets a plurality of additional resistors 405, 406 and 407, the resistors 405 and 406 being set to values identical to that of resistor 403 and resistor 407 being set to values related to the weight of the object in predetermined manner. Thus, referring by way of example to the curve shown in Fig. 11, for various increments of weight, predetermined values of resistor 407 which bear a non-linear relation to weight will be placed into circuit.

The volume of the object is determined by two self-balancing bridges B–8 and B–9 in the manner described with respect to the embodiment shown in Figs. 1 to 7. The resistor 408 of bridge B–9, when such bridge is in balance will become set to a value proportional to the volume of the object and the servo-motor 411 of such bridge B–9 also sets two additional resistors 412 and 413 respectively to the same value.

In the embodiment shown in Fig. 10 the third or controlling parameter is illustratively the length and girth combined of the object. Such parameter may be secured by having three resistors 414, 415 and 416 connected in series, these resistors being set, for example, by the slidable members 46, 47 and 48 shown in Fig. 1. The resistors 415 and 416 which relate to the width and height of the object are desirably calibrated so that resistance proportional to twice the height and twice the width will be set into circuit and the resistor 414 is calibrated so that a resistance proportional to the length will be placed into circuit. Consequently, the sum of the three series connected resistors 414, 415 and 416 will be of value proportional to the length plus the girth of the object. Such resistors are connected into one arm of a self-balancing bridge B–10 and a balancing resistor 417 in the adjacent arm will be set by the servo-motor 418 to a value equal to that of the series connected resistors. In addition, a resistor 419 will also be set by the servo-motor 418 to a corresponding value.

The resistor 407 of the weight bridge B–7 is connected into one arm of a bridge B–11 and the resistor 419 of the length and girth bridge is connected into an adjacent arm of such bridge B–11. The servo-motor 421 of birdge B–11 which will be actuated when the bridge is unbalanced controls a switch 422 which has a movable arm 423 connected to positive main 424 and normally spaced from a fixed contact 425 connected by lead 426 to fixed contact 427 of a relay 428. Relay 428 has a movable arm 429 normally engaging fixed contact 427 when the coil 431 of the relay is deenergized and connected by lead 432 to one side of the coil 433 of a relay 434, the other side of said coil 433 being connected to negative main 435. Relay 434 has a pair of contact arms 436 and 437 normally engaging fixed contacts 438 and 439 and spaced from fixed contacts 441 and 442 respectively. Fixed contact 441 is connected by lead 443 to resistor 412 of bridge B–9 and the arm 436 is connected by lead 444 to junction 445 of a cost bridge B–12. This bridge, like the others, is of the self-balancing type and has a servo-motor 446 connected to set balancing resistor 447 and a cost indicator 448. Fixed contact 438 is connected by lead 449 to resistor 405 of bridge B–7 and the fixed contact 442 and contact arm 437 are connected respectively to servo-motor 452 and servo-amplifier 451 of bridge B–13 to complete a circuit therebetween when such contact 442 and arm 437 are engaged.

The junction 453 of bridge B–13 is connected by lead 454 to the resistor 413 of bridge B–9 and junction 455 of bridge B–13 is connected by lead 456 to resistor 406 of bridge B–7. The servo-motor 452 of bridge B–13 controls a switch 457, the movable arm 458 of which is connected to positive main 424 and normally spaced from fixed contact 459 connected to one side of the coil 431 of relay 428, the other side of said coil being connected to negative main 435.

To illustrate the operation of the equipment shown in Fig. 10, typical values will be assigned to the various resistors. Thus, the resistors 403, 405 and 406 have a value of 1 ohm for each pound of weight and the resistor 407 is calibrated according to the curve shown in Fig. 11, so that based on the weight of the object a resistance related to a combined length and girth of predetermined magnitude will be placed in circuit. The resistor 408 of the volume bridge B–9 is calibrated so that one ohm equals 1 cubic inch and the resistors 412 and 413 are calibrated so that 2 ohms equals one-tenth of a cubic foot. The resistors 415 and 416 of the length and girth bridge B–10 are calibrated so that 2 ohms equals 1 inch, and the resistors 414, 417 and 419 are calibrated so that 1 ohm is equal to 1 inch. The charge to be effected is illustratively based upon a cost of 4 cents a pound or 80 cents a cubic foot and the resistor 447 of the cost bridge B–12 is calibrated so that 1 ohm is related to a charge of 4 cents.

Assuming that an object has a weight of 23 pounds, a length and girth combined of 68 inches and a volume of 1.55 cubic feet, the resistors 403, 405 and 406 each becomes set to a value of 23 ohms and the resistor 407, according to the curve in Fig. 11 becomes set to a value of 94 ohms. The resistors 412 and 413 of the volume bridge B–9 based on the volume of 1.55 cubic feet will each be set to 31.1 ohms and the resistor 419 of the length and girth bridge becomes set to a value of 68 ohms.

Due to the circuit connections previously described, the resistors 407 and 419 of 94 and 68 ohms respectively will become connected in adjacent arms of the bridge B–11. Since the true length and girth of the object is less than the maximum predetermined length and girth of 94 inches for an object weighing 23 pounds, although the bridge B–11 will be unbalanced, the servo-motor 421 will not operate in direction to close the switch 422 and the latter will remain open. Consequently, the resistor 405 which has a value of 23 ohms will remain connected through closed contacts 436 and 438 of relay 434 to junction 445 of the cost bridge B–12 and such bridge will automatically balance so that the value of resistor 447 is equal to that of resistor 405, i. e., to 23 ohms which will be indicated by a charge of 92 cents on the indicator 448.

In the event that the weight should remain 23 pounds and the volume 1.55 cubic feet, but the length and girth should have a value of 111.2 inches, which exceeds the predetermined limit of 94 inches for an object weighing 23 pounds, the values of the resistors previously described will remain the same except for resistor 419 which will become set to a value of 111.2 ohms. Consequently, the bridge B–11 becomes unbalanced but in the opposite direction, as the actual length and girth is greater than the maximum predetermined length and girth. As a result, switch 422 will close to complete a circuit to the coil 433 of relay 434 to energize such relay. This will connect the servo-motor 452 of bridge B–13 to servo-amplifier 451 and will also connect the volume resistor 412 which has a value of 31.1 ohms through closed contacts 436 and 441 to junction 445 of the cost bridge.

Cost bridge B-12 will automatically balance so that the value of resistor 447 becomes equal to that of resistor 445, i. e., to 31.1 ohms, the value of the volume resistor, which will be indicated by a charge of $1.24 on the indicator 448.

As the weight resistor 406 which has a value of 23 ohms and the volume resistor 413 which has a value of 31.1 ohms are thus connected in adjacent arms of bridge B-13 which is now connected into circuit, such bridge becomes unbalanced and servo-motor 452 will be energized, but not in direction to close switch 457. Consequently, relay 428 will not be energized and the volume resistor 412 will remain connected in the cost bridge by reason of the energization of relay 434.

Under certain conditions even though the value of the length and girth, for example, should exceed the predetermined maximum, as indicated on the chart in Fig. 11, a higher revenue is nevertheless afforded to the carrier if the shipping charge be still based on the weight rather than on the volume.

Thus, assuming that the weight of the object is 23 pounds, its volume is .74 cubic feet and its combined length and girth is 96 inches, the resistors 405 and 406 of bridge B-7 will be set to 23 ohms and the resistor 407 will become set to 94 ohms as previously indicated, the volume resistors 412 and 413 each will become set to 14.8 ohms and the resistor 419 of bridge B-10 will become set to 96 inches, the combined length and girth of the object.

As previously described, as the predetermined length and girth of 94 inches for a weight of 23 pounds is exceeded, bridge B-11 becomes unbalanced and its servo-motor 421 will rotate in direction to close switch 422 to energize the coil 433 of relay 434. This will connect the volume resistor 412 which has a value of 14.8 ohms to junction 445 of the cost bridge and will also connect servo-motor 452 to servo-amplifier 451 of bridge B-13. As weight resistor 406 and volume resistor 413 which have values of 23 ohms and 14.8 ohms respectively become connected in adjacent arms of bridge B-13, the latter becomes unbalanced and servo-motor 452 becomes energized, but this time will rotate in the opposite direction to close switch 457. As a result, relay 428 will be energized to open its contacts 427, 429 to break the circuit to relay 434. Consequently, this relay will be deenergized and its contacts 436 and 438 will close disconnecting the volume resistance 412 from the cost bridge and connecting the weight resistance 405 thereto. Thus, the resistance 405 which has a value of 23 ohms becomes connected into the cost bridge which, when in balance provides an indication of 92 cents on the indicator 448 rather than a charge of 59 cents which would have been provided were the volume resistor 412 which has a value of 14.8 ohms to remain in circuit.

Although in the embodiment shown in Figs. 10 and 11 the selectively controlled parameters have been volume and weight and the controlling parameter has been combined length and girth, it is of course to be understood that any combination of parameters can be selected depending on requirements, among which may be weight, volume and other dimensional characteristics of the object.

Wherever volume is used herein it includes either the actual volume of an object if such object is a rectangular parallelopiped such as a cube, for example, or if such object has a different shape, the volume defined within its maximum longitudinal, transverse and vertical dimensions.

The equipments herein described provide a flexible system for automatically determining the rating of an object in manner not limited either to weight or volume alone as a basis for charge and without any arbitrary limitation in the dimensional characteristics of objects accepted for shipment and hence facilitate the determination of rating or charge in manner that will be equitable both to the shipper and the carrier regardless of the weight or dimensions of the object.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus desribed my invention what I claim as new and desire to secure by Letters Patent of the United States is:

1. Means for rating an object by its weight and volume parameters, comprising means for measuring said selected parameters including respectively a weighing scale and distance sensing means the latter responsive to the height, length and width respectively of such object, three variable impedance units correlated respectively with the three distance sensing means, an electrical bridge having two of said variable impedance units connected in opposed arms thereof, a balancing impedance unit connected in a third arm of said bridge, whereby when said bridge is in balance, said balancing unit will be set to value proportional to the product of the two dimensions corresponding to the respective two impedance units, a second electrical bridge, the third variable impedance unit constituting one arm of said bridge, a second arm of said bridge having an additional variable impedance unit operatively connected to said first balancing unit to be set to a value proportional to said product, said third unit and said additional unit being connected in opposed arms of said second bridge, and a second balancing variable impedance unit connected in a third arm of said second bridge, whereby when said second bridge is also in balance, said second balancing unit will be set to the desired value proportional to the volume of such object, i. e., the product of its three dimensions, means under control of the weighing scale to be set to a value corresponding to the weight, correlating means controlled by the settings of said volume and weight determined means and a rating indicator operatively connected to said correlating means.

2. Means for rating an object by its weight and volume parameters, comprising means for measuring said selected parameters including respectively a weighing scale and distance sensing means, the latter responsive to the height, length and width respectively of such object, a variable impedance unit under control of the settings of said three distance sensing means to be set to a value corresponding to the volume or product of the three dimensions, a variable impedance unit under control of the weighing scale to be set to a value corresponding to the weight, correlating means comprising an electrical bridge, said two variable impedance units being connected in adjacent arms of said bridge, a rating indicator, and a switch actuated by unbalance of said bridge selectively to control the rating indicator from one or the other of said variable impedance units.

3. Means for rating an object by its weight and volume parameters, comprising means for measuring said selected parameters including respectively a weighing scale and distance sensing means, the latter responsive to the height, length and width respectively of such object, means under control of the settings of said three distance sensing means to be set to a value corresponding to the volume or product of the three dimensions, means under control of the weighing scale to be set to a value corresponding to the weight, correlating means comprising a differential unit having a pair of input shafts operatively connected respectively to said volume and weight determined means to be moved in opposed direction for subtraction, said differential unit having an output shaft controlled by the settings of said input shafts, a rating indicator, and a switch actuated by said output shafts selectively to control the rating indicator from one or the other of said volume and weight determined means.

4. Equipment for rating an object by at least two parameters thereof selected from its weight and its dimensional characteristics, comprising electrical means for measuring said selected parameters, each of said measuring means having under control thereof an associated adjustable electrical element to be set thereby to a corresponding value, a rating indicator, said electrical elements being connected as arms of a bridge, and means actuated by unbalance of said bridge selectively to connect one of said elements to the rating indicator.

5. Equipment for governing the rating of an object by three parameters thereof selected from its weight and dimensional characteristics, comprising means for measuring said selected parameters, each of said measuring means having under control thereof an associated adjustable element to be set thereby to a corresponding value, a rating indicator, and means controlled by the setting of one of said adjustable elements selectively to determine the effective connection of one or the other of the remaining said adjustable elements to said rating indicator.

6. The combination recited in claim 5 in which the settings of the adjustable elements selectively to be connected to the rating indicator are determined by weight and volume respectively.

7. The combination recited in claim 5 in which the parameter controlling the selection of one or the other adjustable element is a linear dimension of the object.

8. The combination recited in claim 5 in which the parameter controlling the selection of one or the other adjustable element is the girth plus the length of the object.

9. The combination recited in claim 5 in which the rating indicator is normally controlled from one of the two remaining adjustable elements, and in which means is automatically set into operation to compare the rating between the two said remaining adjustable elements when the controlling parameter has selected the adjustable element other than that normally controlling the rating indicator, and in which means automatically restores into circuit the adjustable element normally controlling the rating indicator, where such element determines a rating higher than that to which it is compared.

10. The combination recited in claim 5 in which one of the adjustable elements is normally arranged for effecting operation of the rating indicator and an additional adjustable element under control of the adjustable element set by one of the controlled parameters and having values correlated with various settings of said associated adjustable element is correlated with that adjustable element which is set according to the magnitude of the third or controlling parameter, and means actuated in response to excess of magnitude of the third element over the additional element to effect shift of the effective connection from the normally connected adjustable element to the other adjustable element.

11. The combination recited in claim 10 in which the parameters from which the rating indicator may be effectively operated are weight and volume.

12. The combination recited in claim 5 in which an additional adjustable element is provided having a predetermined range of values correlated with predetermined values of one of the remaining adjustable elements and means are provided to compare the values of the additional adjustable element and the adjustable element associated with the controlling parameter and to select the other of the remaining adjustable elements when the value of the adjustable element associated with the controlling parameter exceeds the value of the additional adjustable element.

13. Equipment for determining the volume of an object comprising a pair of variable impedance units, means to set said units respectively to values proportional to those of two distinct dimensions of such object, an electrical bridge, said units being connected in opposed arms of said bridge, a balancing variable impedance unit connected in a third arm of said bridge, whereby when said bridge is in balance said balancing unit will be set to a value proportional to the product of said two dimensions, a third variable impedance unit, means to set said third unit to a value proportional to the third dimension of such object, an additional variable impedance unit operatively connected to said first balancing unit to be set to a value proportional to said product, a second electrical bridge, said third unit and said additional unit being connected in opposed arms of said second bridge and a second balancing variable impedance unit connected in a third arm of said second bridge whereby when said second bridge is also in balance said second balancing unit will be set to a value proportional to the volume of such object, or the product of its three dimensions.

14. The combination set forth in claim 13 in which each of said bridge circuits has a motor controlled by unbalance of the associated bridge and operatively connected to the associated balancing unit to set the latter, the motor of said first bridge being operatively connected to the additional unit of said second bridge.

15. The combination set forth in claim 13 in which a further unit is provided having associated means to set the latter to a value proportional to weight, and adjustable means are provided controlled by the setting of the second balancing unit and said further unit to be set to a position determined by the setting of said last named two units.

16. The combination set forth in claim 15 in which the adjustable means comprises a switch and a bridge circuit, the further unit is a variable impedance unit and the further unit and the second balancing unit are connected in the bridge circuit for opposing current flow therethrough, said switch being actuated by unbalance of said bridge.

17. The combination set forth in claim 15 in which the adjustable means is a differential unit having a pair of input shafts operatively connected to said second balancing unit and said further unit to be rotated in opposed direction for subtraction, and having an output shaft which is set to a position related to the settings of said units.

References Cited in the file of this patent

UNITED STATES PATENTS

| 1,560,046 | Dye | Nov. 3, 1925 |
| 1,573,850 | Naiman | Feb. 23, 1926 |
| 1,853,198 | Breaden | Apr. 12, 1932 |
| 2,108,575 | Benedict | Feb. 15, 1938 |
| 2,244,369 | Martin | June 3, 1941 |
| 2,584,897 | Marco | Feb. 5, 1952 |